US006586491B2

(12) United States Patent
Husemann et al.

(10) Patent No.: US 6,586,491 B2
(45) Date of Patent: Jul. 1, 2003

(54) POLYACRYLATE BLENDS COMPRISING A COPOLYMERIZED PHOTOINITIATOR

(75) Inventors: Marc Husemann, Hamburg (DE); Stephan Zöllner, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/769,209

(22) Filed: Jan. 25, 2001

(65) Prior Publication Data

US 2002/0006979 A1 Jan. 17, 2002

(30) Foreign Application Priority Data

Feb. 25, 2000 (DE) .......................... 100 08 842

(51) Int. Cl.⁷ .............................. C08F 2/60; C08J 3/28; C09J 133/08
(52) U.S. Cl. .................. 522/35; 522/112; 522/120; 525/218; 525/219; 525/228; 428/343; 428/345; 428/355 AC
(58) Field of Search .................. 522/116, 117, 522/120, 121, 109, 112, 35, 126, 127, 130; 428/355 AC, 343, 345; 525/228, 309, 227, 218, 191

(56) References Cited

U.S. PATENT DOCUMENTS

| | | | | |
|---|---|---|---|---|
| 3,265,772 A | * | 8/1966 | Tocker | 525/220 |
| 3,661,618 A | | 5/1972 | Brookman et al. | |
| 4,144,157 A | * | 3/1979 | Guse et al. | 522/151 |
| 4,185,050 A | * | 1/1980 | Lazear et al. | 525/221 |
| 4,500,683 A | * | 2/1985 | Hori et al. | 524/533 |
| 4,912,169 A | * | 3/1990 | Whitmire et al. | 525/221 |
| 5,047,443 A | | 9/1991 | Rehmer | |
| 5,073,611 A | | 12/1991 | Rehmer et al. | |
| 5,100,963 A | * | 3/1992 | Lin | |
| 5,128,386 A | * | 7/1992 | Rehmer et al. | 522/35 |
| 5,194,455 A | | 3/1993 | Massow et al. | |
| 5,384,341 A | | 1/1995 | Itagaki et al. | |
| 5,506,279 A | * | 4/1996 | Babu et al. | 522/34 |
| 5,536,759 A | * | 7/1996 | Ramharack et al. | 522/35 |
| 5,773,485 A | * | 6/1998 | Bennett et al. | 522/8 |
| 5,905,099 A | * | 5/1999 | Everaerts et al. | 522/126 |
| 6,448,301 B1 | * | 9/2002 | Gaddam et al. | 522/6 |

FOREIGN PATENT DOCUMENTS

| | | |
|---|---|---|
| EP | 0 346 734 A2 | 12/1989 |
| GB | 1143424 | 2/1969 |
| WO | WO 95/19393 | 7/1995 |
| WO | WO 96/35725 | 11/1996 |

OTHER PUBLICATIONS

USPTO translation of DE 27 43 979 B2 to Guse et al., Apr., 1979.*
Derwent English abstract of DE 27 43 979.
Patent Abstract of Japan, Publication No. 2000007879, published Nov. 1, 2000, title: "Hot Melt Resin Composition".
DEP Anet Abstract of EP 0346734, "Derivatives of benzophenone and their preparation".

* cited by examiner

Primary Examiner—Susan W. Berman
(74) Attorney, Agent, or Firm—Morris McLaughlin & Marcus

(57) ABSTRACT

A method of reducing the flow viscosity of a polyacrylate composition, which comprises adding a) to a polyacrylate, a polyacrylate copolymer, a polyacrylate mixture or a mixture of polyacrylates and polyacrylate copolymers having an average molecular weight of more than 500000 g/mol b) a polyacrylate, a polyacrylate copolymer, a polyacrylate mixture or a mixture of polyacrylates and polyacrylate copolymers having an average molecular weight of less than 500000 g/mol, component (b) possessing functional groups crosslinkable by UV irradiation.

22 Claims, 5 Drawing Sheets

POLYACRYLATE BLENDS COMPRISING A COPOLYMERIZED PHOTOINITIATOR

Figure 1:
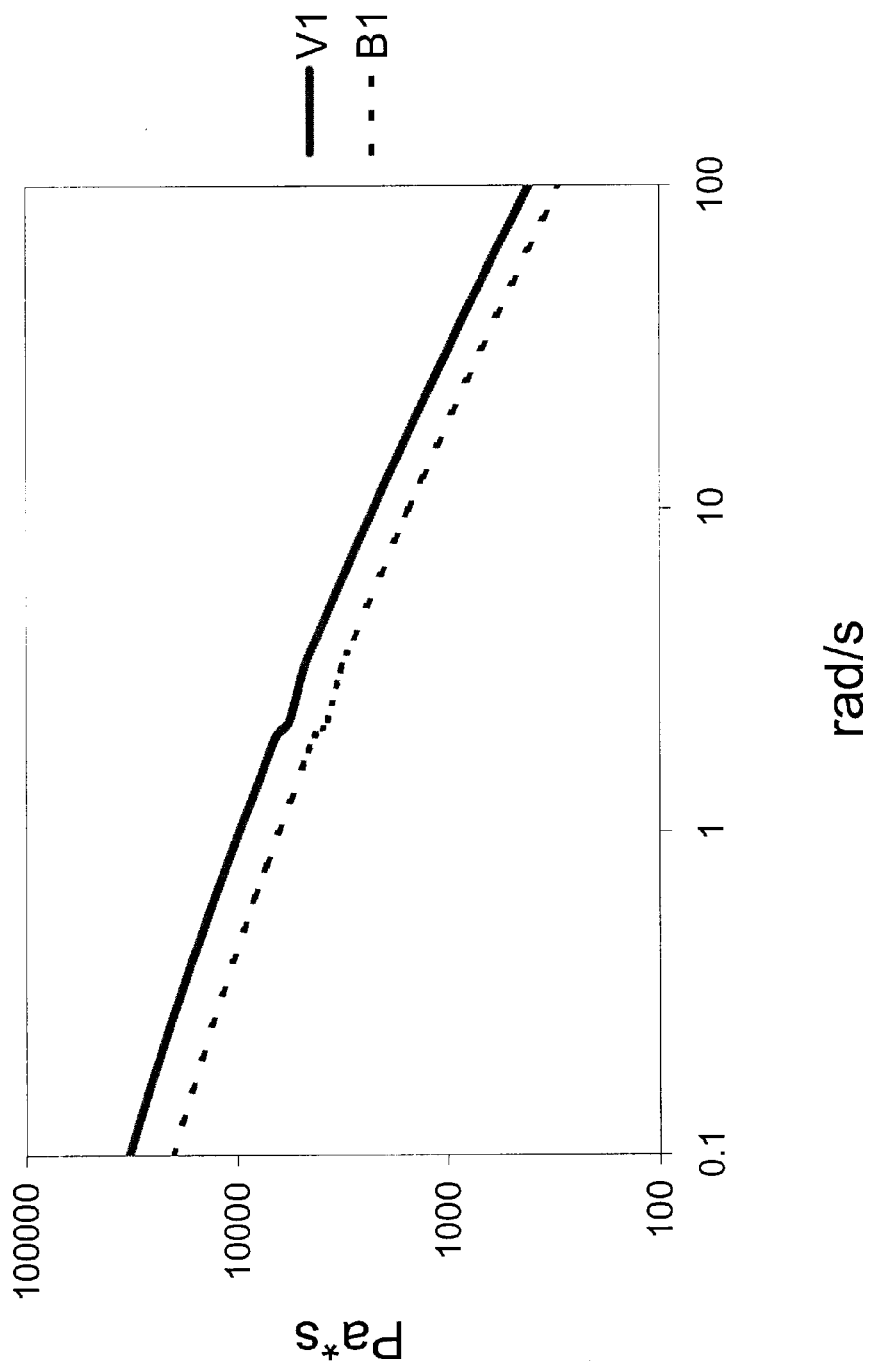

The invention relates to a method of reducing the flow viscosity of polyacrylates for greater ease of processing in an extruder with simultaneous improvement in the adhesive properties.

In the field of pressure-sensitive adhesive compositions, there is an ongoing demand for new developments. Generally, pressure-sensitive adhesive (PSA) compositions are used for pressure-sensitive adhesive tapes, the adhesive tape comprising a backing and a PSA composition. The uses of adhesive tapes are very diverse. One field of application is the medical segment. In the case of skin plasters, there is direct contact between the PSA composition and the patient's skin. For these applications, the requirements imposed on the PSA composition are especially stringent, since it is necessary to avoid the instances of skin irritation and allergic reaction that are nevertheless observed with patients in many cases. However, the direct contact of the adhesive composition with the skin may also be utilized, for example, by implementing active substances in the PSA composition. The active substance is then slowly transferred to the patient via the skin.

A further important field is that of applications in the industrial sector. By way of example, double-sided adhesive tapes are used to bond trimstrips on automobiles, to bond electronic chips, or to bond displays in mobile phones. For high-level industrial applications, polyacrylate PSA compositions are preferred on account of their transparency and weathering stability. Besides these advantages, however, they must also meet stringent requirements in respect of shear strength. This is achieved by means of polyacrylates of high molecular weight, with subsequent efficient crosslinking.

As well as the ongoing optimization of the PSA compositions, however, the application techniques for the coating of the backings are also being optimized. As a result of the cost pressure this produces, the hotmelt coatings are increasingly displacing the traditional solvent coating techniques.

The first acrylic hotmelt PSAs were described in patents as long ago as the 1970s. NL 66 06 711 and NL 70 09 629 first described the use of polyacrylates, or polyacrylates and polymethacrylates, as hotmelt PSAs in PSA tapes. The substances processed most commonly were relatively nonpolar polyacrylates with a low acrylic acid fraction and a low flow viscosity. An attempt was made to solve the problem of the production of adhesive compositions of high shear strength from acrylic hotmelts by means of efficient crosslinking on the backing. In DE 27 43 979 A1, for example, benzoin acrylates were copolymerized as comonomers into the acrylic hotmelt and, after coating, were crosslinked directly on the backing using UV radiation. A similar route to the preparation and processing of acrylic hotmelts was shown in U.S. Pat. No. 5,073,611. In that case, benzophenone and acetophenone were incorporated as acrylated photoinitiators into the acrylate polymer chain. This was followed by crosslinking with UV radiation.

A further method for the efficient crosslinking of the acrylic PSAs is the copolymerization of acrylates having electron-donating groups. Such acrylates stabilize free radicals that form in the course of crosslinking, and thus achieve high degrees of crosslinking after appropriate exposure to UV light or electron beams. Examples are tetrahydrofurfuryl acrylates [EP 0 343 467 B1], tertiary amine monomers [WO 96/35725] and tertiary N-butylacrylamide monomer [U.S. Pat. No. 5,194,455].

Likewise used to reduce flow viscosity and improve the processing properties of hotmelt PSAs is polymer blending with block copolymers. Here, preference is given to the use of SIS and SBS systems (SIS: styrene-isoprene-styrene copolymers; SBS: styrene-butadiene-styrene copolymers). WO 95/19393 described, for example, the blending of such block copolymers with polyacrylates, entailing an increase in the tack of these PSAs.

In contrast, there has been no success to date in attempts to process acrylic hotmelts of high molecular mass and high polarity in an extruder without a reduction in molecular weight, in order to obtain, after extrusion coating, a composition of high shear strength.

The high cohesion of polyacrylates used for adhesive compositions may be explained by the high proportion of polar components. The average molecular weight of the adhesive compositions is 1000000 g/mol. The large number of polar fractions results in a high flow viscosity, which hinders processing in the extruder and the subsequent coating of a backing with this polymer. At high temperatures, in fact, the flow viscosity goes down again, but at excessive temperatures there are instances of damage to the polymer. This process leads to an unwanted deterioration in the adhesive properties of the product.

It is an object of the invention to provide a method whereby the flow viscosity of hotmelt pressure-sensitive adhesives may be reduced with a simultaneous improvement in the profile of adhesive properties. The intention is to optimize the processing properties of the hotmelt PSAs by this means, especially for the hotmelt process and in the extruder. Moreover, it should be possible to crosslink the polymer mixture after processing.

This object is achieved by means of a method as described in the main claim. The dependent claims relate to advantageous embodiments of this method and to the use of the polyacrylates processed by this method.

The invention accordingly provides a method of reducing the flow viscosity of a polyacrylate composition, which comprises adding a) to a polyacrylate, a polyacrylate copolymer, a polyacrylate mixture or a mixture of polyacrylates and polyacrylate copolymers having an average molecular weight of more than 500000 g/mol, b) a polyacrylate, a polyacrylate copolymer, a polyacrylate mixture or a mixture of polyacrylates and polyacrylate copolymers having an average molecular weight of less than 500000 g/mol, component (b) possessing functional groups crosslinkable by UV irradiation.

Particularly advantageous for this method are a component (a) having an average molecular weight of between 500000 and 4000000 g/mol and/or a component (b) having an average molecular weight between 200000 and 400000 g/mol.

A further development comprises, subsequent to this method, first precrosslinking component (b) by ultraviolet irradiation and in a subsequent step achieving crosslinking of the already precrosslinked component (b) with component (a).

It is advantageous for the crosslinking of component (b) with component (a) to be induced by means of electron beams.

It is appropriate to use, as component (a), polyacrylate copolymers of the following monomers a1) acrylates and/or methacrylates of the following formula

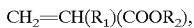

where $R_1=H$ or $CH_3$ and $R_2$ is an alkyl chain with 1–20 carbon atoms,
at 75–100% by weight, especially 86–90% by weight, based on component (a), a2) acrylic acid and/or methacrylic acid of the following formula

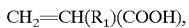

where $R_1=H$ or $CH_3$,
at 0–10% by weight, especially 4–6% by weight, based on component (a), a3) olefinically unsaturated monomers containing functional groups,
at 0–15% by weight, especially 6–8% by weight, based on component (a), at 60–99% by weight, based on the overall polymer blend.

The method proceeds very effectively if component (b) comprises at least one acrylate copolymer with copolymerized photoinitiator at 1–40% by weight, based on the overall polymer blend.

Copolymers of the following composition are, in an outstanding manner, used as component (b):

b1) acrylates and/or methacrylates of the following formula

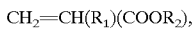

where $R_1=H$ or $CH_3$ and $R_2$ is an alkyl chain with 1–20 carbon atoms,
at 70–99.99% by weight, especially 73–99.9% by weight, based on component (b), b2) acrylic acid and/or methacrylic acid of the following formula

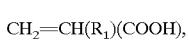

where $R_1=H$ or $CH_3$,
at 0–10% by weight, based on component (b), b3) olefinically unsaturated monomers containing functional groups, at 0–15% by weight, based on component (b), b4) photoinitiator functionalized by olefinic double bonds,
at 0.01–5% by weight, especially 0.1–2% by weight, based on component (b), at 1–40% by weight, based on the overall polymer blend.

Furthermore, a particularly advantageous variant of the method comprises a procedure wherein the polymerization of the monomers to give the mixture of the polyacrylates takes place in the presence of component (b).

The polyacrylate prepared by one of these methods is outstandingly suitable for use as a PSA composition. Backing materials that may be used, for adhesive tapes, for example, are materials customary and familiar to the skilled worker, such as sheets (polyester, PET, PE, PP, BOPP, PVC), nonwovens, wovens and woven sheets, and also release paper, if appropriate. This list is not intended to be conclusive.

The invention described is highly suited to achieving the objects described. It presents a polymer blend whose flow viscosity is greatly reduced as compared with that of the PSA composition on which it is based but whose adhesive properties have at the same time been improved by blending together two polyacrylate components of different average molecular weight.

The polyacrylate of higher molecular mass may be, for example, any polymer which has adhesive properties in accordance with the Handbook of Pressure-sensitive Adhesives, p. 172, §1, 1989. With an average molecular weight of 1000000 g/mol, these adhesive compositions have a high viscosity. Polyacrylates especially suitable for the method described are those having an average molecular weight of between 500000 and 2000000 g/mol.

The viscosity may be reduced by adding a low-viscosity component which acts as a lubricant in the processing step but may subsequently be crosslinked on the backing. For this purpose it is possible and effective to use acrylic copolymers into which a photoinitiator has been copolymerized, which can therefore be activated for a crosslinking reaction by exposure to ultraviolet light. Photoinitiators which may be used in this context are the compounds relevant and known to the skilled worker; the following photoinitiators may be given here by way of example, without wishing to impose any restriction: benzophenones, acrylated or methacrylated benzophenones, benzophenone derivatives, thioxanthones, benzil ketals, α-hydroxyalkyl phenones, α-aminoalkyl phenones, titanocenes, camphorquinones, trichloromethyl-triazines and thioxanthenes.

As correspondingly UV-activatable polymers it is possible with a high level of efficiency to use some commercially available products which are used industrially as polymer blending components. Examples thereof include the acResins A 203 UV® and A 258 UV® [BASF AG]. These polyacrylates have a molecular weight of around 300000 g/mol and are UV-crosslinkable by virtue of a photoinitiator. Owing to low polar fractions and a relatively low molecular weight, the flow viscosity of these products is relatively low.

The examples below are intended to illustrate the invention without subjecting it to any unnecessary restriction.

Test Methods

The following test methods were used to evaluate the adhesive properties of the PSA compositions prepared.

180° Bond Strength Test (Test A)

A 20 mm wide strip of an acrylic PSA composition applied as a film to polyester was applied to steel plates cleaned twice with acetone and once with isopropanol. The PSA strip was pressed onto the substrate twice using a 2 kg weight. The adhesive tape was then immediately peeled from the substrate at 300 mm/min and at an angle of 180°, and the force required to do this was measured. All measurements were conducted at room temperature.

The results are recorded in N/cm and have been averaged from three measurements.

Shear Strength (Test B)

A 13 mm wide strip of the adhesive tape was applied to a smooth steel surface which was cleaned three times with acetone and once with isopropanol. The area of application was 20*13 mm² (length*width). The adhesive tape was then pressed onto the steel support four times, applying constant pressure. At 70° C., a 0.5 kg weight was fastened to the adhesive tape, and a 1 kg weight at room temperature.

The measured shear stability times are reported in minutes and correspond to the average of three measurements.

Dynamic Mechanical Analysis, DMA (Test C)

The measurements were conducted with the dynamic stress rheometer instrument from Rheometrics. The mechanical loss factor tan δ was monitored as a function of the frequency in an interval from 0.1 to 100 rad/s at 130° C. Measurements were carried out with parallel plate arrangement.

Sample Preparation

EXAMPLE 1 (V1)

A 2 l glass reactor conventional for free-radical polymerizations was charged with 20 g of acrylic acid, 40 g of methyl acrylate, 340 g of 2-ethylhexyl acrylate, 133 g of mineral spirit and 133 g of acetone. After nitrogen gas had been passed through the reaction solution with stirring for 45 minutes, the reactor was heated to 58° C. and 0.4 g of 2,2'-azobis(2-methylbutyronitrile was added. Subsequently, the external heating bath was heated to 75° C. and the reaction was carried out constantly at this external temperature. Dilution with 150 g of acetone/mineral spirit mixture in each case was carried out after 4 and 6 h. After a reaction time of 36 h, the polymerization was terminated and the mixture was cooled to room temperature. The polymer was subsequently applied at 50 g/m$^2$ to PET film, cured with electron beams and then adhesion tested using tests A, B and C.

EXAMPLE 2 (V2)

The procedure was like that of example 1. For the polymerization, 20 g of acrylic acid, 40 mg of methyl acrylate, 40 g of N-tert-butylacrylamide and 296 g of 2-ethylhexyl acrylate were used. The solvent amounts were retained.

EXAMPLE 3 (V3)

The procedure was like that of example 1. For the polymerization, 20 g of acrylic acid, 4 mg of maleic anhydride, 188 g of n-butyl acrylate and 188 g of 2-ethylhexyl acrylate were used. The solvent amounts were retained.

EXAMPLE 4 (V4)

The procedure was like that of example 1. For the polymerization, 40 mg of methyl acrylate, 28 g of hydroxyethyl acrylate, 20 g of N-tert-butylacrylamide and 312 g of 2-ethylhexyl acrylate were used. The solvent amounts were retained.

EXAMPLE 5 (B1)

A 2 l glass reactor conventional for free-radical polymerizations was charged with 1000 g of polymer composition V1 (50% in acetone/mineral spirit), with 88.2 g of acResin A 203 UV® [BASF AG] and with 592.4 g of toluene. The mixture was subsequently heated to 100° C. and stirred at this temperature for 1 h. The polymer/polymer blend was applied at 50 g/m$^2$ to PET film, cured with UV light and electron beams and finally adhesion tested using tests A, B and C.

EXAMPLE 6 (B2)

The procedure was like that of example 5. The polymer/polymer blending was carried out using 750 g of V2 (50% in acetone/mineral spirit), 160.7 g of acResin A 203 UV® [BASF AG] and 628.5 g of toluene.

EXAMPLE 7 (B3)

The procedure was like that of example 5. The polymer/polymer blending was carried out using 750 g of V3 (50% in acetone/mineral spirit), 41.6 g of acResin A 203 UV® [BASF AG] and 398.9 g of toluene.

EXAMPLE 8 (B4)

The procedure was like that of example 5. The polymer/polymer blending was carried out using 750 g of V2 (50% in acetone/mineral spirit), 67.9 g of acResin A 203 UV® [BASF AG] and 447.6 g of toluene.

EXAMPLE 9 (B5)

The procedure was like that of example 5. The polymer/polymer blending was carried out using 750 g of V4 (50% in acetone/mineral spirit), 19.7 g of acResin A 258 UV® [BASF AG] and 358.0 g of toluene.

EXAMPLE 10 (B6)

The procedure was like that of example 5. The polymer/polymer blending was carried out using 750 g of V1 (50% in acetone/mineral spirit), 80.4 g of C1 and 550.0 g of toluene.

EXAMPLE 11 (B7)

The procedure was like that of example 5. The polymer/polymer blending was carried out using 750 g of V2 (50% in acetone/mineral spirit), 160.7 g of C2 and 628.5 g of toluene.

EXAMPLE 12 (B8)

A 2 l glass reactor conventional for free-radical polymerizations was charged with 40 g of methyl acrylate, 312 g of 2-ethylhexyl acrylate, 28 g of hydroxyethyl acrylate, 20 g of N-tert-butylacrylamide, 21.1 g of acResin A 203 UV® [BASF AG], 122.4 g of mineral spirit and 122.4 g of acetone. After nitrogen gas had been passed through the reaction solution with stirring for 45 minutes, the reactor was heated to 58° C. and 0.4 g of 2,2'-azobis(2-methylbutyronitrile was added. Subsequently, the external heating bath was heated to 75° C. and the reaction was carried out constantly at this external temperature. Dilution with 150 g of acetone/mineral spirit mixture in each case was carried out after 4 and 6 h. After a reaction time of 36 h, the polymerization was terminated and the mixture was cooled to room temperature. The polymer/polymer blend was subsequently applied at 50 g/m$^2$ to PET film, cured by UV and EBC and finally adhesion tested using tests A and B.

EXAMPLE 13 (B9)

The procedure was like that of example 12. Polymer/polymer blending was carried out using 20 g of acrylic acid, 5 g of maleic anhydride, 188 g of n-butyl acrylate, 188 g of 2-ethylhexyl acrylate, 44.4 g of acResin A 203 UV® [BASF AG], 111.1 g of mineral spirit and 111.1 g of acetone.

EXAMPLE 14 (B10)

The procedure was like that of example 12. Polymer/polymer blending was carried out using 20 g of acrylic acid, 40 g of methyl acrylate, 340 g of 2-ethylhexyl acrylate, 70.6 g of acResin A 203 UV® [BASF AG], 97.7 g of mineral spirit and 97.7 g of acetone.

EXAMPLE 15 (C1)

A 2 l glass reactor conventional for free-radical polymerizations was charged with 18 g of acrylic acid, 40 g of N-tert-butylacrylamide, 340 g of 2-ethylhexyl acrylate and 2 g of acrylated benzophenone Ebecryl P36® [UCB], 16 g of isopropanol, 133 g of mineral spirit and 133 g of acetone. After nitrogen gas had been passed through the reaction solution with stirring for 45 minutes, the reactor was heated to 58° C. and 0.4 g of 2,2'-azobis(2-methylbutyronitrile was added. Subsequently, the external heating bath was heated to 75° C. and the reaction was carried out constantly at this external temperature. Dilution with 150 g of acetone/mineral spirit mixture and 9 g of isopropanol in each case was carried out after 4 and 6 h. After a reaction time of 24 h, the polymerization was terminated and the mixture was cooled to room temperature. GPC (gel chromatography) measurement gave an average molecular weight of 280000 g/mol.

EXAMPLE 16 (C2)

A 2 l glass reactor conventional for free-radical polymerizations was charged with 14 g of acrylic acid, 160 g of n-butyl acrylate, 160 g of 2-ethylhexyl acrylate, 64 g of methyl acrylate and 2 g of benzoin acrylate, 16 g of isopropanol, 133 g of mineral spirit and 133 g of acetone. After nitrogen gas had been passed through the reaction solution with stirring for 45 minutes, the reactor was heated to 58° C. and 0.4 g of 2,2'-azobis(2-methylbutyronitrile) was added. Subsequently, the external heating bath was heated to 75° C. and the reaction was carried out constantly at this external temperature. Dilution with 150 g of acetone/mineral spirit mixture and 9 g of isopropanol in each case was carried out after 4 and 6 h. After a reaction time of 22 h, the polymerization was terminated and the mixture was cooled to room temperature. GPC (gel chromatography) measurement gave an average molecular weight of 250000 g/mol.

Results

The first component of this invention comprises the reduction in flow viscosity by blending with a low viscosity polyacrylate (acResin A 203 UV® or A 258 UV® [BASF AG]) which can be cured by UV crosslinking. First of all, various PSA compositions were prepared on a polyacrylate basis. The comonomer composition of these polyacrylates was very varied. One typical polymer contained 70–94% nonpolar monomers, such as 2-ethylhexyl acrylate (2-EHA), n-butyl acrylate (n-BuA) and/or longer-chain alkyl acrylates, 5–25% polar fractions, such as methyl acrylate (MA), acrylic acid (AA) or hydroxyethyl acrylate (HEA) and 0–10% N-tert-butylacrylamide (NTBAM). Following monomer compositions were polymerized conventionally in solution by free-radical polymerization with 2,2'-azobis(2-methylbutyronitrile) and adhesion tested as a reference for the polymers (table 1):

TABLE 1

| Example | AA [%] | MA [%] | HEA [%] | NTBAM [%] | EHA [%] | BuA [%] | MSA [%] |
|---------|--------|--------|---------|-----------|---------|---------|---------|
| V1 | 5 | 10 | 0 | 0 | 85 | 0 | 0 |
| V2 | 5 | 10 | 0 | 10 | 74 | 0 | 1 |
| V3 | 5 | 0 | 0 | 0 | 47 | 47 | 1 |
| V4 | 0 | 10 | 7 | 5 | 78 | 0 | 0 |

For adhesion testing, all adhesive compositions were coated at 50 g/m² onto polyester film and then crosslinked using electron beams.

TABLE 2

| Example | SST 10 N [min] (test B) | SST 5 N 70° C. [min] (test B) | BS-steel [N/cm] (test A) | BS-PE [N/cm] (test A) |
|---------|-------------------------|-------------------------------|--------------------------|------------------------|
| V1 | 10000 | 8339 | 4.5 | 1.2 |
| V2 | 10000 | 10000 | 4.6 | 1.1 |
| V3 | 10000 | 1254 | 5.2 | 1.4 |
| V4 | 7849 | 2418 | 4.7 | 1.2 |

SST: shear stability times
BS: bond strength

Below, a number of polymers of the starting compounds V1–V4 were blended with different proportions of acResin A 203 UV® and A 258 UV® [BASF AG], after which the flow viscosity was measured by DMA. For the first, range finding analyses, polymer blends were prepared with stirring in a 2 l glass reactor in toluene at 100° C. The blends are listed in table 3:

TABLE 3

| Blends | V [%] | acResin A 203 UV® [%] | acResin A 258 UV® [%] |
|--------|-------|------------------------|------------------------|
| B1 | V1 85% | 15% | |
| B2 | V2 70% | 30% | |
| B3 | V3 90% | 10% | |
| B4 | V2 85% | 15% | |
| B5 | V4 95% | | 5% |

Subsequently, the flow viscosity of the polymer blends B1–B5 was measured by DMA and compared with the original polymers V1–V4. The flow viscosity was measured by DMA in a frequency interval from 0.1 to 100 rads/s. A measurement temperature of 130° C. was chosen, since high temperatures are used to coat the backings in the hotmelt process. The results are shown in FIGS. 1–5.

Figure 2:
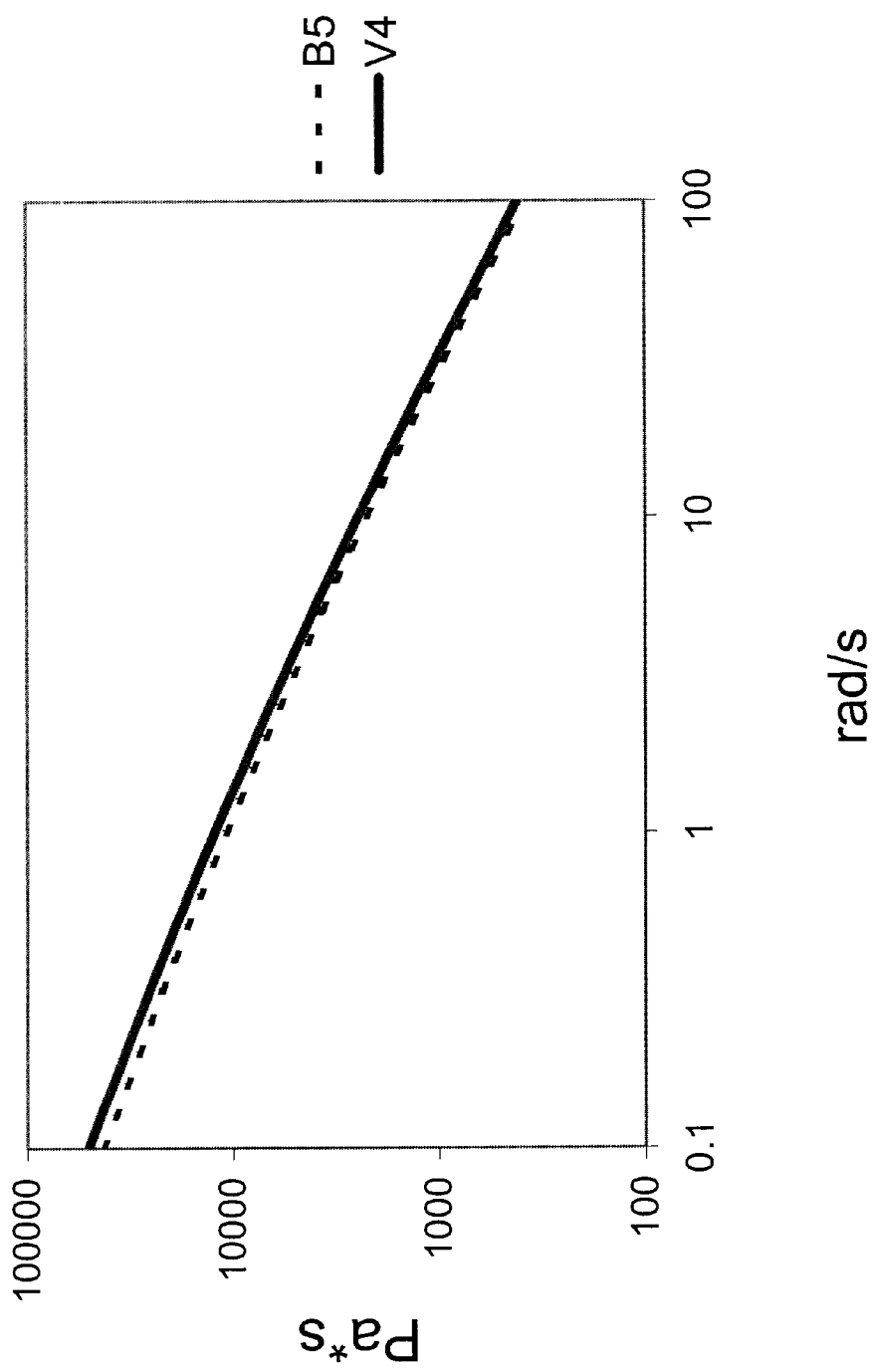
Figure 3:
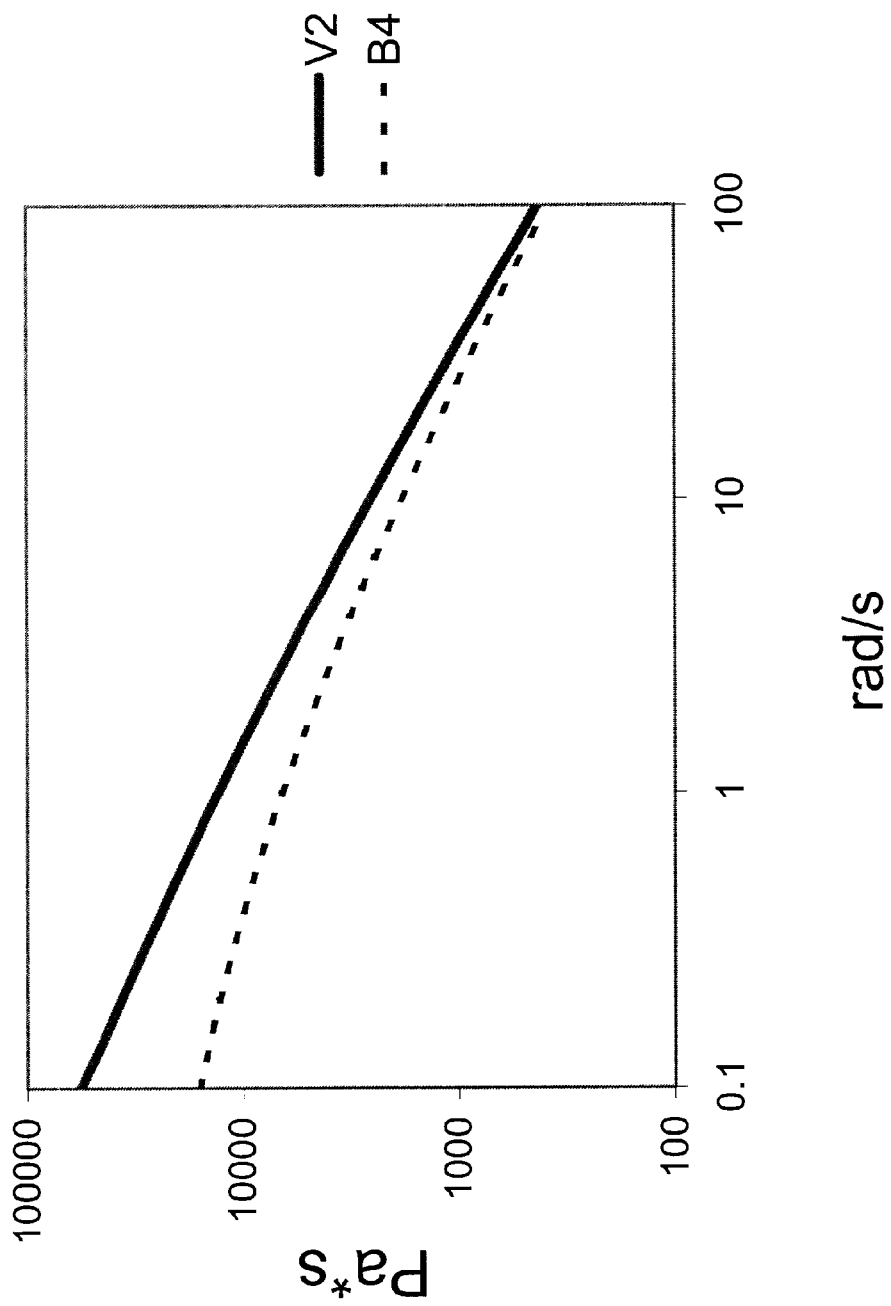
Figure 4:
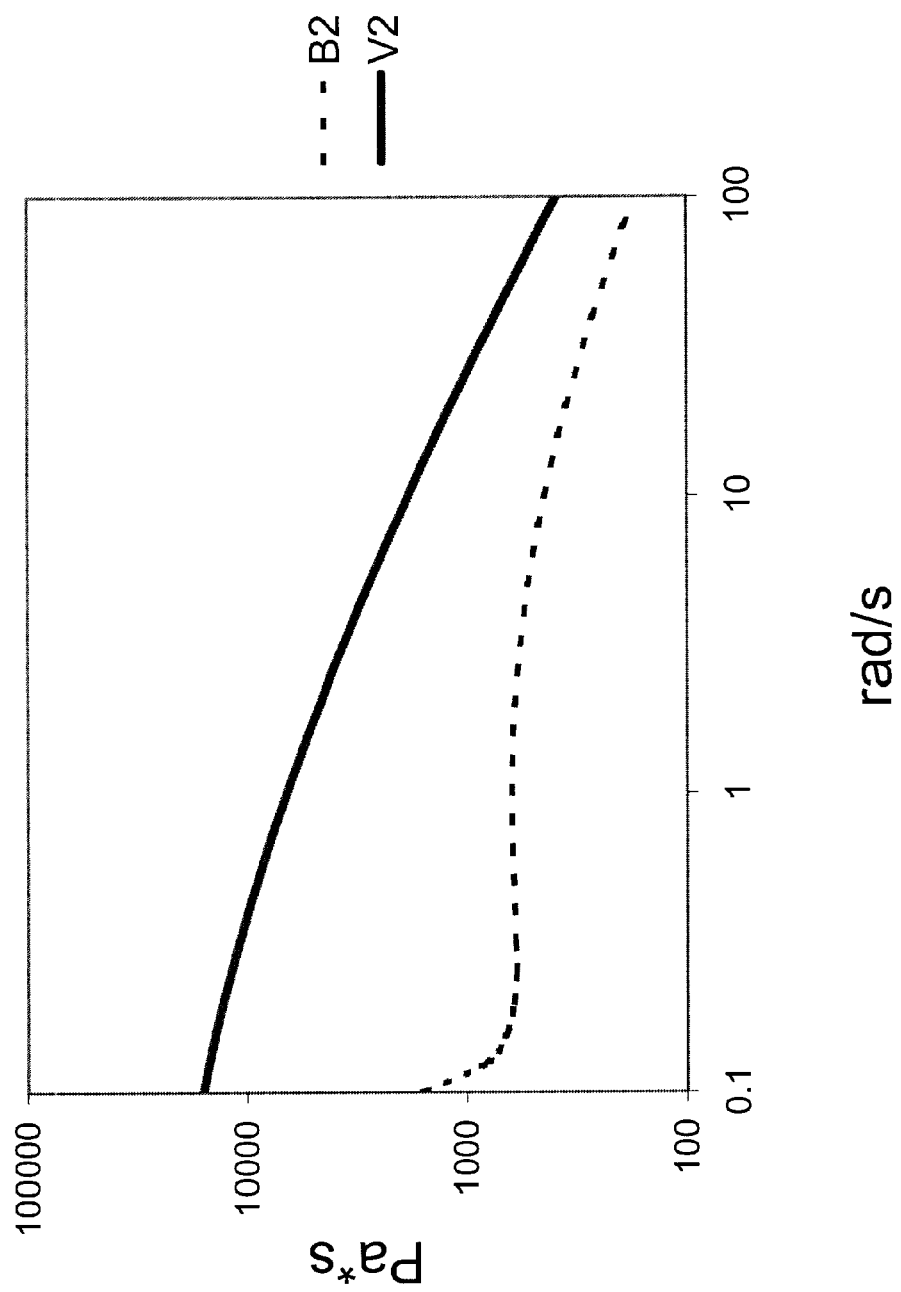
Figure 5:
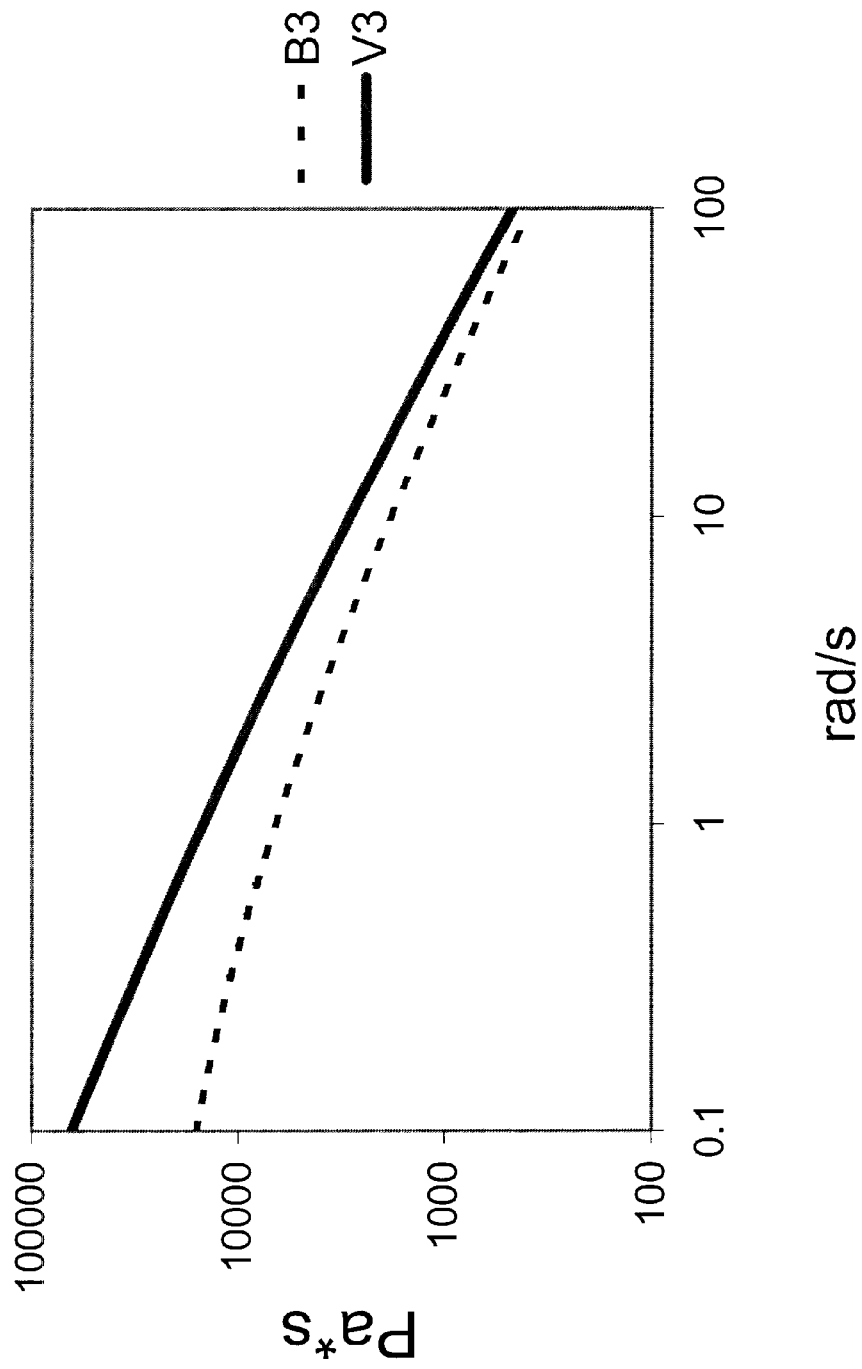

FIG. 1  Flow viscosity of blend B1 and of polyacrylate V1 at 130° C. in a frequency interval between 0.1 and 100 rad/s
FIG. 2  Flow viscosity of blend B5 and of polyacrylate V4 at 130° C. in a frequency interval between 0.1 and 100 rad/s
FIG. 3  Flow viscosity of blend B4 and of polyacrylate V2 at 130° C. in a frequency interval between 0.1 and 100 rad/s
FIG. 4  Flow viscosity of blend B2 and of polyacrylate V2 at 130° C. in a frequency interval between 0.1 and 100 rad/s
FIG. 5  Flow viscosity of blend B3 and of polyacrylate V3 at 130° C. in a frequency interval between 0.1 and 100 rad/s A comparison of the flow viscosities (FIGS. 1–5) shows that the flow viscosity is reduced by polymer blending with acResins A 203 UV® and A 258 UV® [BASF AG]. The effect is small for the 5% addition, but becomes greater and greater as the low molecular mass fraction increases. At 30% addition (see blend 2), the flow viscosity at 1 rad/s is reduced by a factor of almost 10. Blend 2 likewise possesses an extremely low flow viscosity in solution. In the concentration step and in the subsequent coating operation, the advantages become clear: B2 requires a significantly lower heating temperature than V2 for concentration in the extruder. In order to achieve the same throughput, a concentration temperature which is lower by 20° C. is required. Moreover, a 20% higher throughput can be achieved for the blend B2 at the same temperature. Accordingly, the blend is not subjected to such severe thermal stress, and damage to the polymer can be reduced.

In addition to the reduction in flow viscosity, the adhesive properties are also of interest. Normally, these properties are impaired by the addition of plasticizers. In particular, there is a sharp decrease in the shear strength of the adhesive composition.

For more precise testing, further UV-crosslinking polyacrylates of low molecular mass were prepared. DE 27 43 979 A1 reported the influence of copolymerized benzoin acrylate on UV crosslinking of polyacrylates. In analogy thereto, two polyacrylates with the following composition were polymerized (table 4):

TABLE 4

| Example | AA [%] | MA [%] | NTBAM [%] | EHA [%] | Photoinitiator [%] | BuA [%] | $M_w$ [g/mol] |
|---|---|---|---|---|---|---|---|
| C1 | 4.5 | 0 | 10 | 85 | 0.5 A | 0 | 28 0000 |
| C2 | 3.5 | 16 | 0 | 40 | 0.5 B | 40 | 25 0000 |

A = acrylated benzophenone Ebecryl P 36 ®[UCB];
B = acrylated benzoin acrylate

By adding isopropanol as a regulator in the free-radical polymerization, the average molecular weight was reduced to below 300000 g/mol. Subsequently, the compositions V1 and V2 were blended with the UV-curable polyacrylates thus prepared (see table 6):

TABLE 6

| Blends | V [%] | C1 [%] | C2 [%] |
|---|---|---|---|
| B6 | V1 85% | 15% | |
| B7 | V2 70% | | 30% |

Thereafter, blends B1–B7 were tested for their adhesive properties. For crosslinking, the blends were exposed to UV light and then aftercured by irradiation with electron beams. The UV exposure activates the acResins A 203 UV® or A 258 UV® [BASF AG] or C1 or C2, respectively, and the relatively low molecular mass polymers react with one another to form longer-chain polymers. Subsequently, the polymer blend is aftercured with electron beams. Electron beam curing (EBC) preferentially generates radicals on the long polymer chains and forms a second network. As a result of EBC, accordingly, the UV network is further incorporated into a larger network. However, the reverse process likewise operates—only with a poorer efficiency.

The fact that the process of UV crosslinking with subsequent EBC proceeds very effectively is shown by the results of the adhesive tests in table 7:

TABLE 7

| Blend | SST 10 N RT [min] | SST 5 N 70° C. [min] | BS-steel [N/cm] | BS-PE [N/cm] |
|---|---|---|---|---|
| B1 | +10 000 | +10000 | 5.8 | 1.9 |
| B2 | +10 000 | +10000 | 6.1 | 2.0 |
| B3 | +10 000 | 2341 | 6.5 | 2.5 |
| B4 | +10 000 | +10000 | 4.9 | 1.5 |
| B5 | +10 000 | 4837 | 4.8 | 1.1 |
| B6 | +10 000 | +10000 | 5.6 | 1.8 |
| B7 | +10 000 | +10000 | 5.9 | 2.0 |

The shear strength of blend B1 is similar to that of the unblended base composition. In both shear tests, shear stability times of more than 10000 minutes are achieved. A comparison of the bond strengths shows that there is a marked increase in the bond strength to steel and PE as a result of the low molecular mass fraction of the acResin. Accordingly, alongside the reduction in flow viscosity, there is also an improvement in the bond strengths, while the shear strength remains at the same level. A comparison with the blends B2–B5 shows a similar trend. Blend B2 has the same shear strength as the starting polymer V2 but shows a marked improvement in bond strength, with 6.1 N/cm to steel and with 2.0 N/cm to PE. The same applies to blends B3 and B4. Blend B5, in contrast, was subjected to somewhat stronger UV crosslinking. As a result, the bond strengths remained at the same level, whereas an improvement was measured in the shear stability times. The results for blends 6 and 7 were similar to those found for blends 1 and 2. Evidently, the principle of polymer blending with a UV-crosslinking acrylic adhesive composition is not dependent on the UV photoinitiator.

In summary, the addition of the acResin A 203 UV or A 258 UV (depending on amount) or of a corresponding UV-crosslinkable acrylate copolymer having a lower average molecular weight (<500000 g/mol) produces a marked reduction in flow viscosity. The adhesive properties may be adjusted by way of the degree of curing. With moderate UV curing, the shear stability times remain at the same level and the bond strengths go up. With severe UV crosslinking, in contrast, an improved cohesion is built up and the bond strengths remain at the same level.

In the second part of this invention, different concepts for the polymer/polymer blending are investigated 1) Normally, acResins A 258 UV or A 203 UV are dissolved in toluene and mixed with the reference acrylic PSA composition at 100° C. with stirring in a reactor. After about 1 h of stirring, the solutions were transparent and the polymer blends were applied to a backing by the conventional solvent coating technique.

2) The second concept comprises blending by polymerization in the presence of the acResins A 203 UV or A 258 UV. For this purpose, the free-radical polymerization was conducted with acrylates in solution in the presence of the acResins. The regulating action of the acResins is very low, so that the polymerization was conducted with a mixture of solvent and acResin. Comparison with conventional blending in toluene showed that for amounts of acResin of up to 10%, the adhesive performance achieved was the same.

TABLE 8

| Blends | Composition | SST 10 N RT [min] | SST 5 N 70° C. [min] | BS-steel [N/cm] | BS-PE [N/cm] |
|---|---|---|---|---|---|
| B11 | V4 + 5% A 203 UV | +10000 | +10000 | 4.9 | 1.0 |
| B12 | V3 + 10% A 203 UV | +10000 | 2143 | 6.3 | 2.6 |
| B13 | V1 + 15% A 203 UV | 7524 | 2975 | 5.1 | 1.6 |

Comparing, for example, blend B12, prepared by in situ polymerization in the presence of 10% acResin A 203 UV® [BASF AG], with blend B3, prepared by blending in toluene at 100° C., the profile of adhesive properties obtained is virtually the same. Similar comments apply to polymer blend B11 in comparison with B4. In contrast, blend B13 suffers a marked loss in performance relative to B1. The shear stability times become significantly shorter and there is also a fall in the level of the bond strength. An explanation is certainly that excessive amounts excessively alter the molecular weight distribution of the base polymer, and hence also vary the properties of the blend produced.

3) As a final alternative, the inline process was investigated: i.e., the acResin is metered in to the base composition in a melt in an extruder. Since the acResins possess a relatively low softening temperature, they can be metered in at just 70–80° C. To trial this process, blend B4 was prepared by this technology. The hotmelt extrudates produced were not entirely so homogeneous and transparent as the polymers blended in hot toluene. After coating, UV curing and EBC, adhesion testing was repeated. The results in table 9 make it clear that a somewhat poorer adhesive performance was achieved with compounding in the extruder.

TABLE 9

| Blend | SST 10 N RT [min] | SST 5 N 70° C. [min] | BS-steel [N/cm] | BS-PE [N/cm] |
|---|---|---|---|---|
| B4 | +10 000 | 8 363 | 4.8 | 1.6 |

All three techniques are suitable for the preparation of polymer blends.

What is claimed is:

1. A method of preparing a polymer blend, said method comprising:
   a) providing a first polyacrylate component having an average molecular weight of more than 500,000 g/mol, said first polyacrylate component being selected from the group consisting of polyacrylates, polyacrylate copolymers, polyacrylate mixtures, and mixtures of polyacrylates and polyacrylate copolymers; and
   b) adding a second polyacrylate component having an average molecular weight of less than 500,000 g/mol to said first polyacrylate component to reduce the flow viscosity of said first polyacrylate component, said second polyacrylate component possessing copolymerized photoinitiator functional groups crosslinkable by ultraviolet irradiation, and said second polyacrylate component being selected from the group consisting of polyacrylates, polyacrylate copolymers, polyacrylate mixtures, and mixtures of polyacrylates and polyacrylate copolymers.

2. The method according to claim 1, wherein the first polyacrylate component has an average molecular weight of between 500,000 and 4,000,000 g/mol and/or the second polyacrylate component has an average molecular weight between 200,000 and 400,000 g/mol.

3. The method according to claim 1, which further comprises
   precrosslinking of said second polyacrylate component by ultraviolet irradiation, and thereafter crosslinking of said second polyacrylate component with said first polyacrylate component.

4. The method according to claim 3, wherein crosslinking of said second polyacrylate component with said first polyacrylate component is induced by electron beams.

5. The method according to claim 1, wherein said first polyacrylate component comprises at least 60–99% by weight of the polymer blend, and comprises a mixture of polyacrylates of the following monomers:
   a) 75–100% by weight of said first polyacrylate component of acrylates and/or methacrylates of the following formula:

$CH_2=CH(R_1)(COOR_2)$, where $R_1$=H or $CH_3$ and $R_2$ is an alkyl chain with 1–20 carbon atoms;
   b) 0–10% by weight of said first polyacrylate component of acrylic acid and/or methacrylic acid of the following formula:

$CH_2=CH(R_1)(COOH)$, where $R_1$=H or $CH_3$; and
   c) 0–15% by weight of said first polyacrylate component of olefinically unsaturated monomers containing functional groups.

6. The method according to claim 5, wherein said first polyacrylate component comprises at least 60–99% by weight of the polymer blend, and comprises a mixture of polyacrylates of the following monomers:
   a) 86–90% by weight of said first polyacrylate component of acrylates and/or methacrylates of the following formula:

$CH_2=CH(R_1)(COOR_2)$, where $R_1$=H or $CH_3$ and $R_2$ is an alkyl chain with 1–20 carbon atoms;
   b) 4–6% by weight of said first polyacrylate component of acrylic acid and/or methacrylic acid of the following formula:

$CH_2=CH(R_1)(COOH)$, where $R_1$=H or $C_3$; and
   c) 6–8% by weight of said first polyacrylate component of olefinically unsaturated monomers containing functional groups.

7. The method according to claim 1, wherein said second polyacrylate component comprises 1–40% by weight of the polymer blend.

8. The method according to claim 7, wherein said second polyacrylate component comprises 1–40% by weight of the polymer blend, and comprises a mixture of polyacrylates of the following monomers:

a) 70–99.99% by weight of said second polyacrylate component of acrylates and/or methacrylates of the following formula:

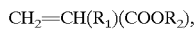

where $R_1$=H or $CH_3$ and $R_2$ is an alkyl chain with 1–20 carbon atoms;

b) 0–10% by weight of said second polyacrylate component of acrylic acid and/or methacrylic acid of the following formula:

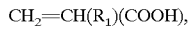

where $R_1$=H or $CH_3$;

c) 0–15% by weight of said second polyacrylate component of olefinically unsaturated monomers containing functional groups; and d) 0.01–5% by weight of said second polyacrylate component of photoinitiator functionalized by olefinic double bonds.

9. The method according to claim 8, wherein the second polyacrylate component comprises 0.1–2% by weight of the second polyacrylate component of photoinitiator functionalized by olefinic double bonds.

10. The method according to claim 1, wherein a preparation of the first polyacrylate component takes place in the presence of the second polyacrylate component.

11. A method of preparing a pressure-sensitive adhesive product, said method comprising:

a) preparing a polymer blend according to any one of claims 1–10; and b) applying the polymer blend as a pressure-sensitive adhesive to a substrate.

12. A polymer blend comprising:

a) a first polyacrylate component having an average molecular weight of more than 500,000 g/mol, said first polyacrylate component being selected from the group consisting of polyacrylates, polyacrylate copolymers, polyacrylate mixtures, and mixtures of polyacrylates and polyacrylate copolymers; and b) a second polyacrylate component having an average molecular weight of less than 500,000 g/mol in an amount effective to reduce the flow viscosity of said first polyacrylate component, said second polyacrylate component possessing copolymerized photoinitiator functional groups crosslinkable by ultraviolet irradiation, and said second polyacrylate component being selected from the group consisting of polyacrylates, polyacrylate copolymers, polyacrylate mixtures, and mixtures of polyacrylates and polyacrylate copolymers.

13. The polymer blend according to claim 12, wherein the first polyacrylate component has an average molecular weight of between 500,000 and 4,000,000 g/mol and/or the second polyacrylate component has an average molecular weight between 200,000 and 400,000 g/mol.

14. The polymer blend according to claim 12, wherein said second polyacrylate component has been pre-crosslinked by ultraviolet irradiation, and thereafter said second polyacrylate component has been crosslinked with said first polyacrylate component.

15. The polymer blend according to claim 14, wherein crosslinking of said second polyacrylate component with said first polyacrylate component has been induced by electron beams.

16. The polymer blend according to claim 12, wherein said first polyacrylate component comprises at least 60–99% by weight of the polymer blend, and comprises a mixture of polyacrylates of the following monomers:

a) 75–100% by weight of said first polyacrylate component of acrylates and/or methacrylates of the following formula:

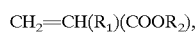

where $R_1$=H or $CH_3$ and $R_2$ is an alkyl chain with 1–20 carbon atoms;

b) 0–10% by weight of said first polyacrylate component of acrylic acid and/or methacrylic acid of the following formula:

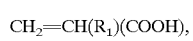

where $R_1$=H or $CH_3$; and c) 0–15% by weight of said first polyacrylate component of olefinically unsaturated monomers containing functional groups.

17. The polymer blend according to claim 16, wherein said first polyacrylate component comprises at least 60–99% by weight of the polymer blend, and comprises a mixture of polyacrylates of the following monomers:

a) 86–90% by weight of said first polyacrylate component of acrylates and/or methacrylates of the following formula:

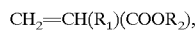

where $R_1$=H or $CH_3$ and $R_2$ is an alkyl chain with 1–20 carbon atoms;

b) 4–6% by weight of said first polyacrylate component of acrylic acid and/or methacrylic acid of the following formula:

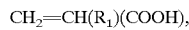

where $R_1$=H or $CH_3$; and c) 6–8% by weight of said first polyacrylate component of olefinically unsaturated monomers containing functional groups.

18. The polymer blend according to claim 12, wherein said second polyacrylate component comprises 1–40% by weight of the polymer blend.

19. The polymer blend according to claim 18, wherein said second polyacrylate component comprises 1–40% by weight of the polymer blend, and comprises a mixture of polyacrylates of the following monomers:

a) 70–99.99% by weight of said second polyacrylate component of acrylates and/or methacrylates of the following formula:

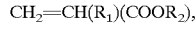

where $R_1$=H or $CH_3$ and $R_2$ is an alkyl chain with 1–20 carbon atoms;

b) 0–10% by weight of said second polyacrylate component of acrylic acid and/or methacrylic acid of the following formula:

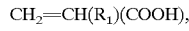

where $R_1$=H or $CH_3$;

c) 0–15% by weight of said second polyacrylate component of olefinically unsaturated monomers containing functional groups; and d) 0.01–5% by weight of said second polyacrylate component of photoinitiator functionalized by olefinic double bonds.

20. The polymer blend according to claim 19, wherein the second polyacrylate component comprises 0.1–2% by weight of the second polyacrylate component of photoinitiator functionalized by olefinic double bonds.

21. The polymer blend according to claim 12, wherein a preparation of the first polyacrylate component has taken place in the presence of the second polyacrylate component.

22. A pressure-sensitive adhesive product comprising:

a) a polymer blend according to any one of claims 12–21, applied to;

b) a substrate.

* * * * *

UNITED STATES PATENT AND TRADEMARK OFFICE
CERTIFICATE OF CORRECTION

PATENT NO. : 6,586,491 B2
DATED : July 1, 2003
INVENTOR(S) : Husemann et al.

It is certified that error appears in the above-identified patent and that said Letters Patent is hereby corrected as shown below:

Column 12,
Line 17, "according ta" should read -- according to --

Signed and Sealed this

Twenty-fifth Day of January, 2005

JON W. DUDAS
*Director of the United States Patent and Trademark Office*